(12) United States Patent
Llorente et al.

(10) Patent No.: US 12,466,607 B2
(45) Date of Patent: **\*Nov. 11, 2025**

(54) APPARATUS TO HOUSE BOTANICALS DURING TRANSPORT

(71) Applicant: Monica Llorente, Key Biscayne, FL (US)

(72) Inventors: Monica Llorente, Key Biscayne, FL (US); Mariana Llorente, Key Biscayne, FL (US); Catalina Llorente, Key Biscayne, FL (US); Juan Sebastian Onate Guzman, Bogota (CO); Catalina Acero Corredor, Bogota (CO)

(73) Assignee: Monica Llorente, Key Biscayne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,944

(22) Filed: Mar. 14, 2024

(65) Prior Publication Data
US 2024/0217695 A1     Jul. 4, 2024

Related U.S. Application Data

(63) Continuation of application No. 18/168,892, filed on Feb. 14, 2023, now Pat. No. 11,945,628, which is a
(Continued)

(51) Int. Cl.
*B65D 5/32* (2006.01)
*A01G 9/02* (2018.01)
(Continued)

(52) U.S. Cl.
CPC ............ *B65D 5/328* (2013.01); *A01G 9/026* (2013.01); *B65D 5/0085* (2013.01); *B65D 5/321* (2013.01); *B65D 5/52* (2013.01); *B65D 85/52* (2013.01)

(58) Field of Classification Search
CPC .......... A01G 9/026; B65D 81/36; B65D 5/52; B65D 5/321; B65D 5/0085; B65D 5/328;
(Continued)

(56) References Cited

U.S. PATENT DOCUMENTS 1,923,525 A * 8/1933 Ainslie ................. B65D 5/321
229/122.29
6,006,496 A * 12/1999 Weder .................... B65D 85/52
53/399
(Continued)

FOREIGN PATENT DOCUMENTS

FR       2925023 A1 *  6/2009   ........... B65D 5/5007

*Primary Examiner* — Anthony D Stashick
*Assistant Examiner* — L Kmet
(74) *Attorney, Agent, or Firm* — Esplin & Associates, PC

(57) ABSTRACT

An apparatus for housing botanicals during transport is disclosed. The apparatus may be configured to convert to a display assembly for the botanicals. The apparatus may include: a covering component having a primary opening on one end and a permeable structure on a second end; a sleeve component having a support structure on one end and a receiving opening on a second end, the sleeve component being configured to be partially inserted into the covering component; a holding component having a secondary opening at one end and a water-tight chamber wall at the other end, the holding component being configured to be partially inserted into the sleeve component, such that the secondary opening is positioned within the sleeve component; in order facilitate converting the apparatus into a display assembly, the covering component is removed from the sleeve component and the holding component is inserted into the covering component.

10 Claims, 6 Drawing Sheets

Related U.S. Application Data continuation of application No. 17/713,440, filed on Apr. 5, 2022, now Pat. No. 11,613,401.

(51) Int. Cl.
 *B65D 5/00* (2006.01)
 *B65D 5/52* (2006.01)
 *B65D 85/52* (2006.01)

(58) Field of Classification Search
 CPC .... B65D 85/52; B65D 85/505; B65D 5/5038; A47G 7/063
 See application file for complete search history.

(56) References Cited

U.S. PATENT DOCUMENTS

| | | | |
|---|---|---|---|
| 11,945,628 B2 * | 4/2024 | Llorente | A47F 7/0078 |
| 2013/0105563 A1 * | 5/2013 | Lee | B65D 5/242 |
| | | | 229/186 |

* cited by examiner

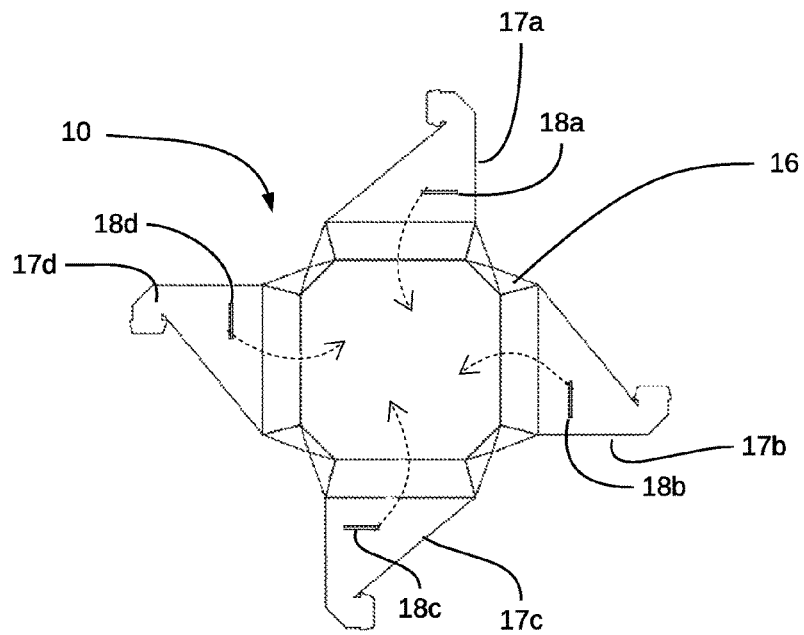
FIG. 4A
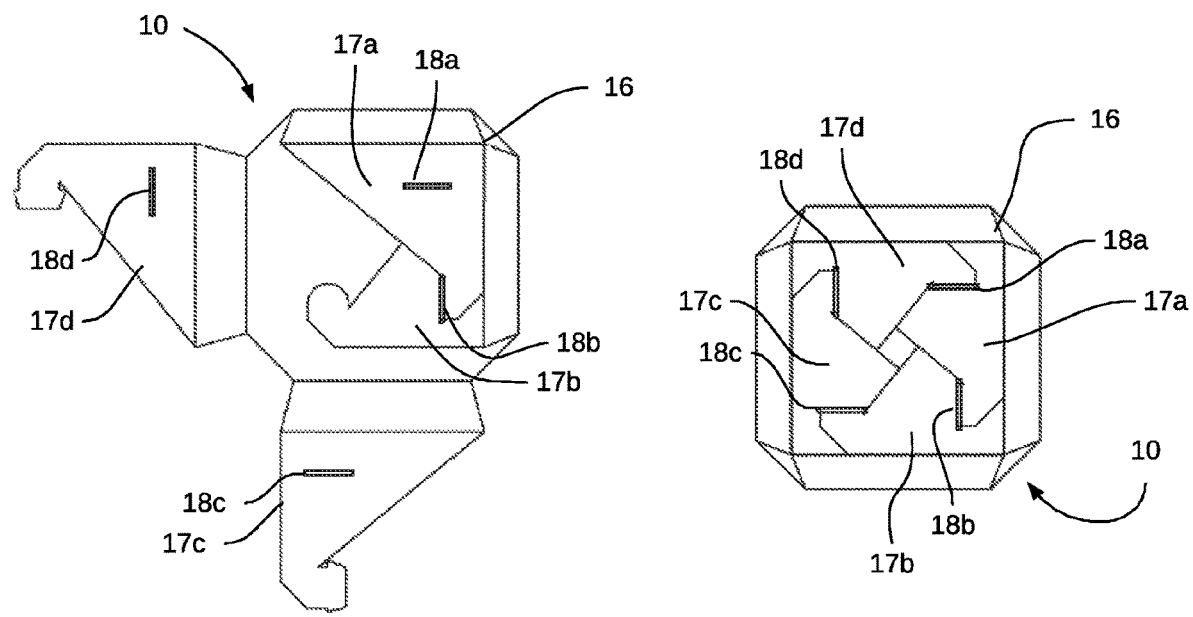
FIG. 4B  FIG. 4C

APPARATUS TO HOUSE BOTANICALS DURING TRANSPORT

FIELD OF THE DISCLOSURE

The present disclosure relates to an apparatus configured to house botanicals during transport. The apparatus may be capable of conversion to a display assembly for displaying the botanicals after transport.

BACKGROUND

Different types of packaging for shipping and transporting botanicals and/or flowers are known. Types of packaging may protect flowers from damage during transport. Structures for displaying flowers are known (e.g., vases, stands, racks, etc.). Typically, the recipient of packaged and/or shipped flowers simply removes the flowers from the packaging and displays them in a separate structure (e.g., a vase or other structures). The packaging in which the flowers were shipped may be discarded.

SUMMARY

The present disclosure describes an apparatus that provides both (i) protection for botanicals during transport, and (ii) a structure in which the botanicals may be displayed subsequent to transport. The apparatus may be configured to house botanicals during transport and may be capable of being converted into a display assembly for displaying the botanicals after transport. In some implementations, the apparatus may comprise a covering component, a sleeve component, a holding component, and/or other components.

In some implementations, the covering component may be formed from a first flat piece of packaging material that is shaped into a longitudinal shape. The longitudinal shape may have a primary opening at a first end. The primary opening may be of an internal cavity formed within the longitudinal shape. The longitudinal shape of the covering component may include a permeable structure formed at a second end of the longitudinal shape that is opposite the first end.

In some implementations, the sleeve component may be formed from a second flat piece of packaging material that is shaped into a longitudinal shape. The longitudinal shape may have a providing opening at one end and a receiving opening at the other end opposite the providing opening. The providing opening and/or the receiving opening may communicate an internal cavity formed within the longitudinal shape of the sleeve component. The providing opening may include a support structure formed of one or more tabs extending across the providing opening. The longitudinal shape of the sleeve component may be sized to slide inside the primary opening of the covering component. Responsive to the sleeve component being slid inside the primary opening, the sleeve component may be housed partially within the internal cavity of the covering component. The providing opening of the sleeve component may be disposed inside the internal cavity of the covering component and/or the end of the sleeve component with the receiving opening may extend out of the primary opening of the covering component. The sleeve component may include one or more perforated segments along the length of the longitudinal shape and/or other components. Individual ones of the perforated segments may run around the circumference of the longitudinal shape of the sleeve component.

In some implementations, the holding component may be formed from a third flat piece of packaging material. The third flat piece of packaging material may be water resistant. The holding component may shaped to form a chamber having a secondary opening at one end and a chamber wall at the other end opposite the secondary opening. The longitudinal shape of the holding component may sized to slide inside the receiving opening of the sleeve component. Responsive to the holding component being slid into the receiving opening, the holding component may be housed partially within the receiving opening, such that the secondary opening of the holding component may be disposed inside the internal cavity of the sleeve component.

In some implementations, in order to facilitate the apparatus being converted into the display assembly, the sleeve component may be removable from the primary opening of the covering component. The one or more perforated segments of the sleeve component may be removable to facilitate access to the holding component. The holding component may be configured to be inserted into the internal cavity of the covering component via the primary opening. Responsive to the holding component being inserted into the internal cavity of the covering component, the chamber wall of the holding component may be positioned within the internal cavity at or near the end of the covering component having the permeable structure.

As used herein, any association (or relation, or reflection, or indication, or correspondency) involving components, openings, segments, cavities, tabs, edges, flaps and/or another entity or object that that is part of the apparatus and/or plays a part in the apparatus, may be a one-to-one association, a one-to-many association, a many-to-one association, and/or a many-to-many association or N-to-M association (note that N and M may be different numbers greater than 1).

These and other features, and characteristics of the present technology, as well as elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4A-C illustrates a top-down view of the covering component, in accordance with one or more implementations.

DETAILED DESCRIPTION

Figure 1:
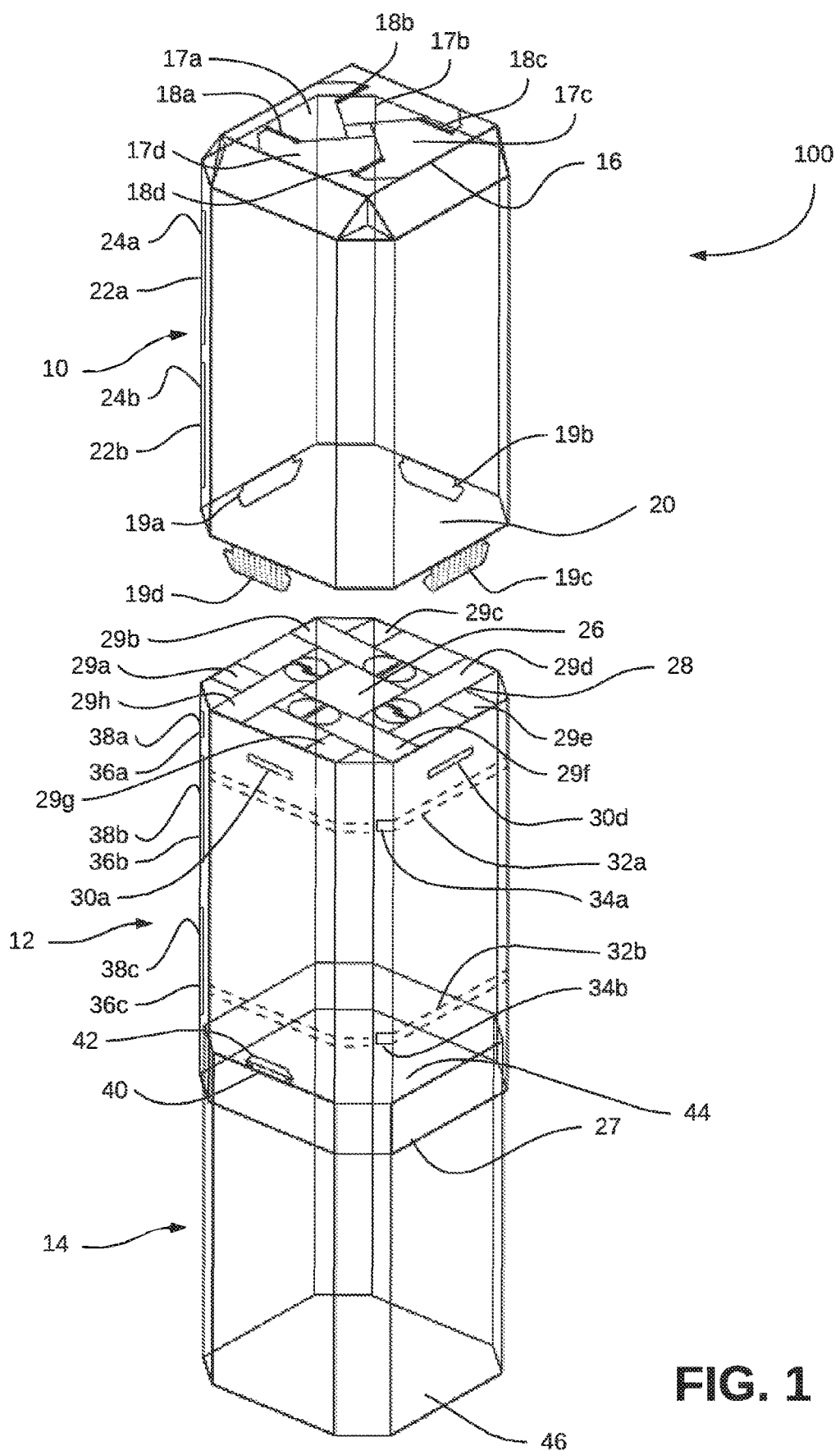
FIG. 1 illustrates the apparatus configured to house botanicals, in accordance with one or more implementations.
Figure 2:
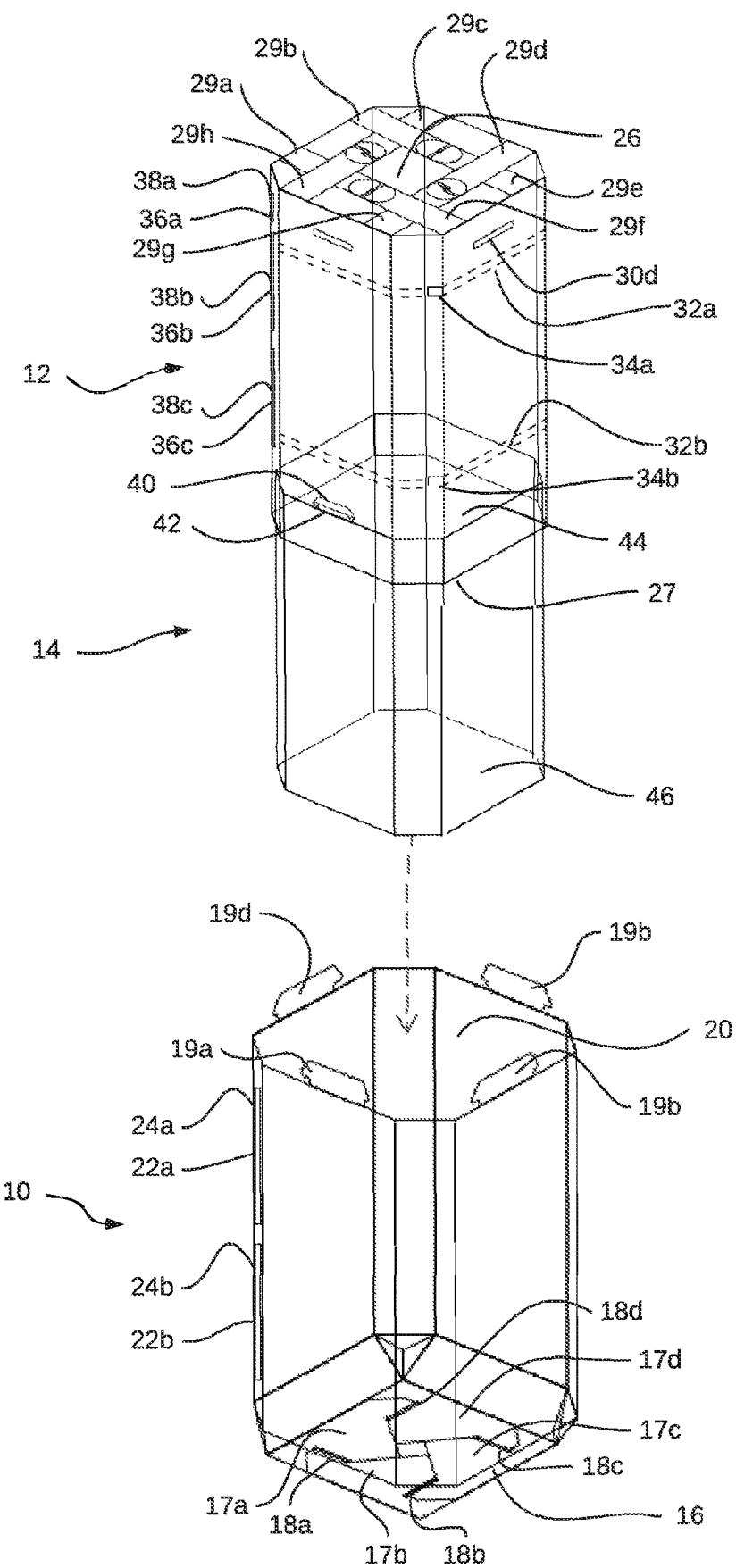
FIG. 2 illustrates the apparatus configured to display botanicals, in accordance with one or more implementations.
Figure 3:
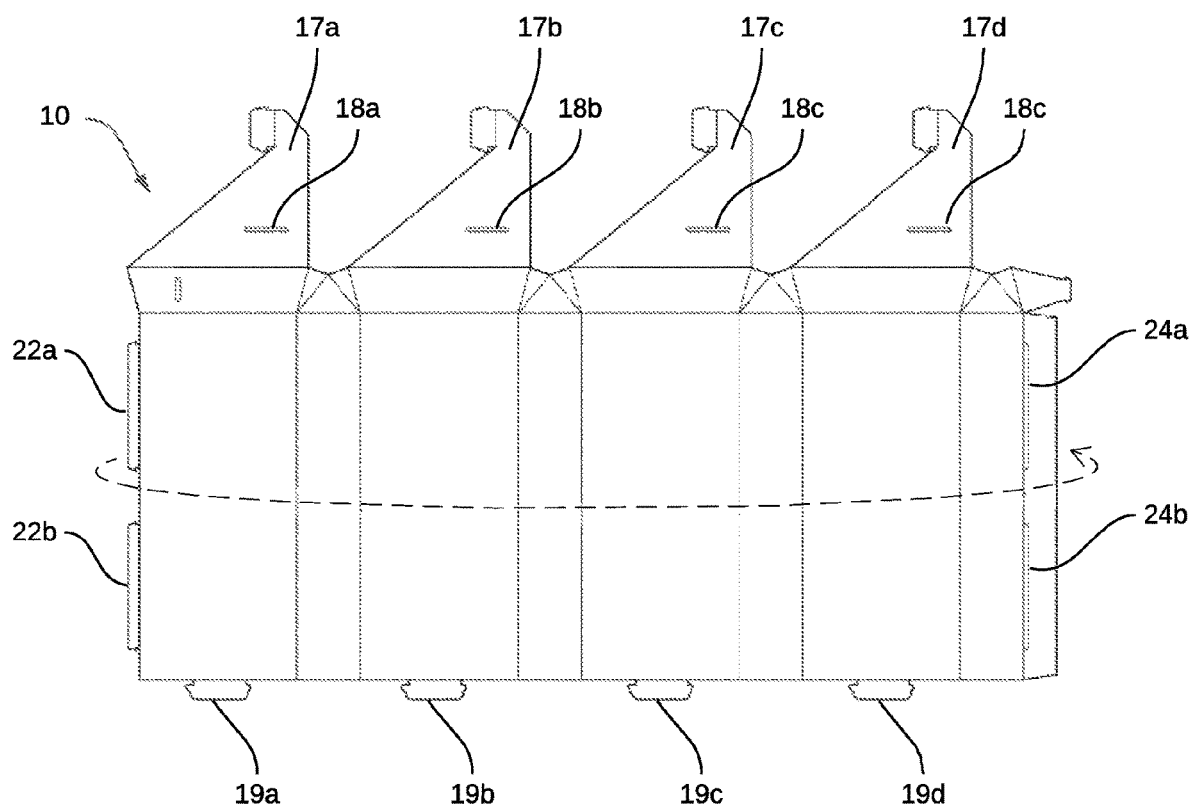
FIG. 3 illustrates a first flat piece of packaging material that may form the covering component.
Figure 5:
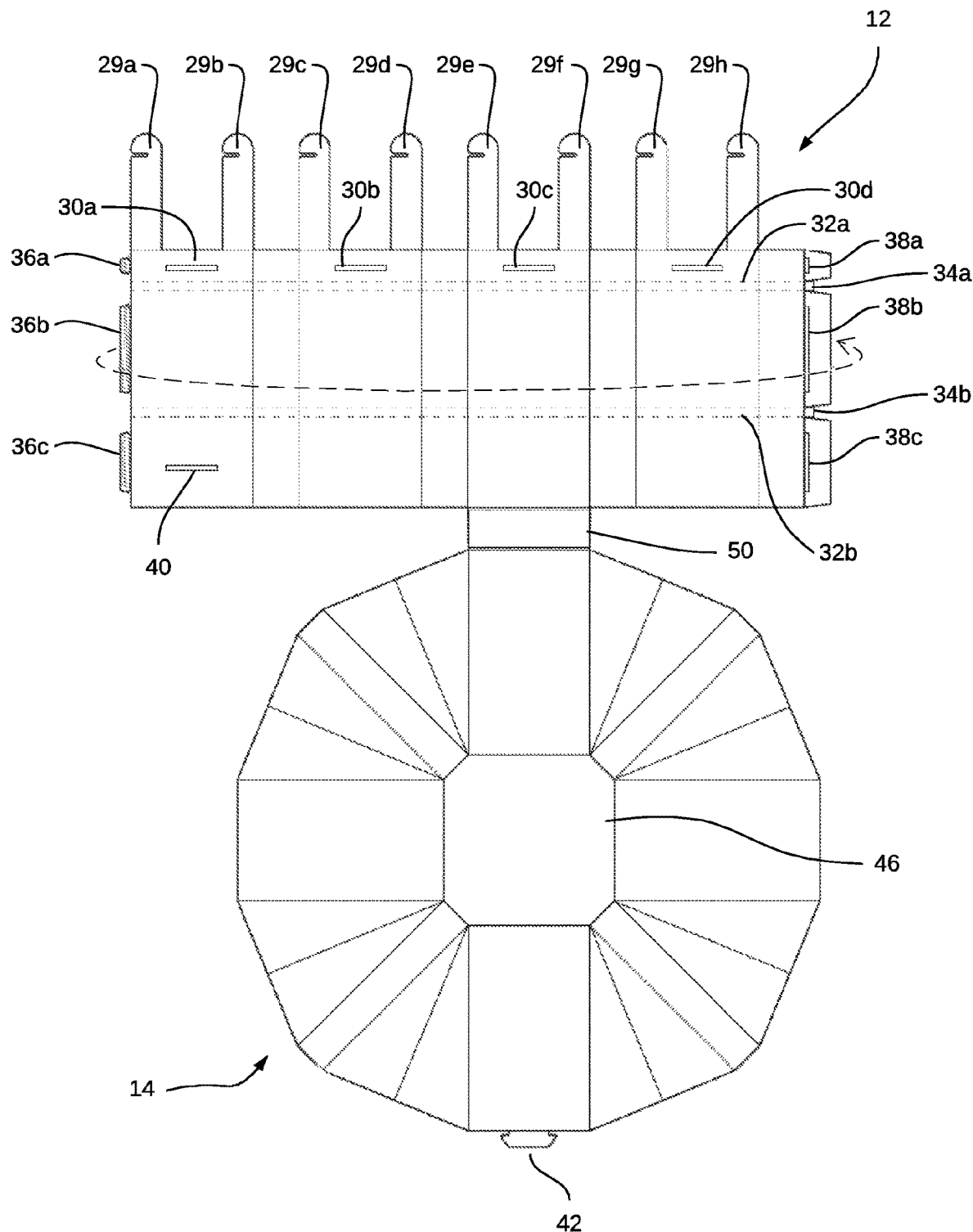
FIG. 5 illustrates a second flat piece of packaging material that may form the sleeve component and a third flat piece of packaging material that form the holding component, in accordance with one or more implementations.

FIG. 1 illustrates an exploded view of apparatus 100 configured to house botanicals during transport. Apparatus 100 may include one or more of a covering component 10, a sleeve component 12, a holding component 14, and/or other components. In some implementations, apparatus 100 and/or components of apparatus 100 may be constructed of a water-resistant material that is foldable. By way of non-limiting illustration, apparatus 100 may be constructed of corrugated stone paper cardboard and/or other types of water-resistant materials. Apparatus 100 and/or the one or more components of apparatus 100 may be configured in one or more states including an unstructured state, a transport state, a display state, and/or other states. In some implementations, apparatus 100 may be in an unstructured state prior to one or more flat pieces of packaging material being shaped to form the packaging. FIGS. 3-5 illustrates apparatus 100 and/or components of apparatus 100 configured in the unstructured state. In some implementations, apparatus 100 may be in the transport state during use of the shaped packaging (i.e., during transportation of the botanicals). FIG. 2 illustrates and exploded view of apparatus 100 configured in the transport state. In some implementations, apparatus 100 may in the display state subsequent to the conversion of apparatus 100 from the packaging to a display assembly.

FIG. 1 illustrates covering component 10 configured in the transport state. Covering component 10 may be formed of a first flat piece of packaging material that is shaped into a longitudinal shape. The longitudinal shape may resemble the shape of a cylinder, an elongated box, and/or other shapes. In some implementations, the longitudinal shape may be optimized for the length and/or size of botanicals being packaged. For example, a covering component for botanicals having longer flowers may have a more elongated shape compared to a covering component for botanicals having shorter flowers that may have a less elongated shape. The longitudinal shape of covering component 10 may include a primary opening 20 at a first end, a permeable structure 16 formed at a second end that is opposite the first end, one or more connecting tabs 19a-d, and/or other components. Primary opening 20 may be of an internal cavity of covering component 10. The internal cavity of covering component 10 may be configured to cover and/or protect the flowers (also referred to as the blooms) of the botanicals being housed in apparatus 100 during the transport state. In some implementations, covering component 10 may be constructed of a material having sufficient stiffness (i.e., rigidity, firmness) to prevent collapse, depression, and/or other damage to covering component 10 and the botanicals housed within covering component 10.

Covering component 10 may be configured to couple with sleeve component 12 while apparatus 100 is configured in the transport state. The longitudinal shape of covering component 10 may be size such that sleeve component 12 may be configured to be slid and/or inserted into primary opening 20. In some implementations, one or more connecting tabs 19a-d of covering component 10 may be configured to be inserted into one or more corresponding slits 30a-d of sleeve component 12 subsequent to sleeve component 12 being slid into primary opening 20. Responsive to the one or more connecting tabs 19a-d being inserted into one or more corresponding slits 30a-d, covering component 10 may be secured to sleeve component 12 such that sufficient effort by a user may be required to separate the components. In some implementations, covering component 10 and sleeve component 12 may be secured through one or more adhesive surfaces positioned on the interior surface of the longitudinal shape of covering component 10 and/or on the exterior surface of a longitudinal shape of sleeve component 12. While configured in the transport state, covering component 10 may facilitate covering (i.e., housing, casing, etc.) the bloom portions of the botanicals being housed within apparatus 100.

FIG. 3 shows covering component 10 configured in the unstructured state prior to the first flat piece of packaging being shaped to form the longitudinal shape of covering component 10 (as shown in FIG. 1). In some implementations the first flat piece of packaging may be formed of a single (i.e., contiguous) piece of packaging or may be formed of multiple pieces of packaging that are affixed to form a single piece of packaging. The first piece of packaging may include one or more fastening tabs 22a-b, one or more slits 24a-b, flaps 17a-d, connecting tabs 19a-d, and/or other components. Responsive to covering component 10 being in the unstructured state, flaps 17a-d may not be engaged and/or permeable structure 16 may not be formed. Similarly, connecting tabs 19a-d may not be engaged with any slits and/or other components of apparatus 100 during the unstructured state.

In some implementations, one or more of fastening tabs 22a-b may be configured to be inserted into one or more corresponding slits 24a-b to secure the first flat piece of packaging after folding and/or shaping. By way of non-limiting illustration, the first flat piece of packaging may be folded and/or shaped according to the direction indicated by the dotted arrow and/or or folded along the indicated lines, such that fastening tab 22a may be inserted into slit 24a and/or fastening tab 22b may be inserted into slit 24b. In some implementations, the first flat piece of packaging may not include the one or more fastening tabs 22a-b and/or slits 24a-b, rather a first edge of the first flat piece of packaging may be glued or otherwise affixed to a second side edge to secure the longitudinal shape of covering component 10.

FIG. 4A-C shows a top-down view of permeable structure 16 during transition from the unstructured state to the transport state. FIG. 4A illustrates the first flat piece of packaging subsequent to being shaped to form the longitudinal shape of covering component 10 and prior to flaps 17a-d being secured to form permeable structure 16. Flaps 17a-d may extend from an edge of covering component 10 at or near the second end (opposite the first end having primary opening 20). Flaps 17a-d may include slit(s) 18a-d, and/or other components. In some implementations, individual ones of flaps 17a-d are configured to fold inwardly towards the internal cavity of covering component 10 to secure with one or more adjacent flaps 17a-d via the one or more slits 18a-d. Flaps 17a-d may include one or more portions having hook shapes and/or other shapes to facilitate securing between flaps. By way of non-limiting illustration, a portion of flap 17a may be configured to be inserted into slit 18b of flap 17b (as shown in FIG. 4B). A portion of flap 17b may be configured to be inserted into slit 18c of flap 17c, and so on and so forth. Permeable structure 16 may be formed responsive to some or all of flaps 17a-d being secured within slits 18a-d (as shown in FIG. 4C). In some implementations, flaps 17a-d may be glued together or otherwise affixed to form permeable structure 16.

As shown in FIG. 4C, permeable structure 16 may not be water-tight and/or air-tight. Permeable structure 16 may include one or more openings and/or gaps that are configured to facilitate air flow through the internal cavity of covering component 10. The circulation of air through the internal cavity of covering component 10 may be required for the preservation of the botanicals during transport. FIG. 4C may illustrate permeable structure 16 immediately after the unstructured state and/or during the transport state.

Referring to FIG. 2, covering component 10 may be removed from sleeve component 12 during a transition from apparatus 100 being configured in the transport state to apparatus 100 being configured in the display state. The transition may characterize the conversion of apparatus 100 from the packaging to the display assembly for displaying the botanicals. Removing component 10 from sleeve component 12 may require removal of one or more connecting tabs 19a-d from one or more slits 30a-d of sleeve component 12. In some implementations, covering component 10 may be positioned such that permeable structure 16 is placed on a surface (e.g., table, shelf, etc. where the botanicals are displayed) and/or serves as a base of the display assembly (as shown in FIG. 2). Permeable structure 16 may include sufficient flatness and structure to support apparatus 100 remaining in an upright position while configured in the transport state.

In some implementations, the longitudinal shape of covering component 10 may facilitate inserting holding component 14 into primary opening 20 (as indicated by the dotted arrow), such that holding component 14 may be positioned wholly or partially within the internal cavity of covering component 10. Connecting tabs 19a-d may be removed from covering component 10 and/or may be folded inwardly toward the internal cavity of covering component 10 such that connecting tabs 19a-d are not visible or readily accessible in the transport state.

Figure 6:
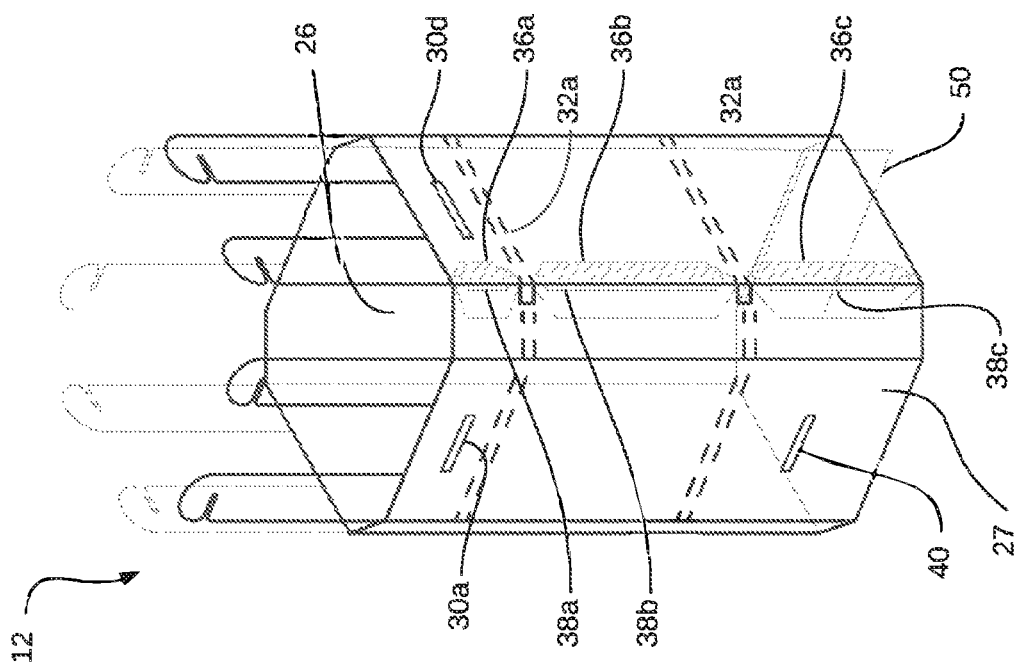
FIG. 6 illustrates the sleeve component of the apparatus, in accordance with one or more implementations.

Referring to FIG. 1, sleeve component 12 may be formed from a second flat piece of packaging material that is shaped into a longitudinal shape, responsive to apparatus 100 being configured in the transport state. The longitudinal shape of sleeve component 12 may be a tunnel-like shape, a tubular shape, a rectangular shape and/or other shapes. Sleeve component 12 may include a providing opening 26, a receiving opening 27, a support structure 28, one or more perforated segments 32a-b, one or more slits 30a-d, and/or other components. Providing opening 26 may be at a first end of the longitudinal shape and receiving opening 27 may be at a second end that is opposite from the first end (as shown in FIG. 6). Sleeve component may further include an internal cavity that is communicated from providing opening 26 to receiving opening 27. In some implementations, botanicals may be housed within apparatus 100 such that the flowers (i.e., blooms) of the botanicals are positioned on the exterior of sleeve component 12 and the stems of the botanicals are positioned within support structure 28 and the internal cavity of sleeve component 12.

In some implementations, support structure 28 may be positioned at and/or across providing opening 26 and may be configured to support the stems of the botanicals housed within apparatus 100 configured in the transport state. Support structure 28 may be formed of one or more tabs 29a-h arranged in a grid-like configuration across providing opening 26. The one or more tabs 29a-h may be configured to engage (i.e., attach, secure) with one or more other tabs included in sleeve component 12. For example, tab 29a may be configured to secure to tab 29f. Tab 29a may be positioned across the circumference of the longitudinal shape of sleeve component 12 from tab 29f. Similarly, tab 29b may be configured to engage with tab 29e, tab 29c may be configured to engage with tab 29h, and so on and so forth (as shown in FIG. 1). In some implementations, tab 29a and tab 29f may secured by a hooking mechanism (as shown in FIG. 6), a gluing mechanism, and/or other attachment mechanisms. Support structure 120 may include 2 tabs, 4 tabs, 10 tabs, 12 tabs, and/or other numbers of tabs arranged in a grid-like configuration. In some implementations, support structure may be configured to support the stem portions of the botanicals to prevent crushing and/or flattening of the blooms of the botanicals.

The one or more perforated segments 32a-b may be positioned along the length of the longitudinal shape of sleeve component 12 and may extend around the circumference of the longitudinal shape. Sleeve component 12 is shown as having two perforated segments, however this is not intended to be limiting. In some implementations, sleeve component 12 may have 1, 2, 3, 4, and/or other numbers of perforated segments. Individual ones of perforated segments 32a-b may include one or more tags 34a-b extending from the surface of perforated segments 32a-b. The one or more tags 34a-b may facilitate tearing of perforated segments 32a-b so that perforated segments 32a-b may be removed during the conversion of apparatus 100 from the packaging to the display assembly.

Sleeve component 12 may be configured to be partially housed within covering component 10 while apparatus 100 is configured in the transport state. The longitudinal shape of sleeve component 12 may be sized so that the end of sleeve component 12 having providing opening 26 may be inserted into primary opening 20. Responsive to sleeve component 12 being partially housed within covering component, providing opening 26 and/or support structure 28 may be disposed within the internal cavity of covering component 10. Sleeve component 12 may be secured within covering component 10 by connecting tabs 19a-d (of covering component 10) being inserted into the corresponding slits 30a-d. Slits 30a-d may be positioned near providing opening 26 along the length of the longitudinal shape of sleeve component 12. In some implementations, the portion of sleeve component 12 extending from the slits 30a-d to providing opening may be housed within covering component 10 and therefore not visible during the transport state.

Sleeve component 12 may be configured to partially house holding component 14 while apparatus 100 is configured in the transport state. The longitudinal shape of sleeve component 12 may be sized so that holding component 14 may be inserted into receiving opening 27. One or more connecting tabs 42 of holding component 14 may be configured to be inserted into one or more corresponding slits 40 of sleeve component 12. Responsive to the one or more connecting tabs 42 being inserted into one or more corresponding slits 40, sleeve component 12 may be secured to holding component 14 such that sufficient effort by a user may be required to separate the components. In some implementations, sleeve component 12 and holding component 14 may be secured through one or more adhesive surfaces positioned on the interior surface of the longitudinal shape of sleeve component 12 and/or on the exterior surface of a longitudinal shape of holding component 14. In some implementations, holding component 14 may be inserted into and/or secured to sleeve component 12. The stems of the botanicals may then be inserted through the grid of support structure 28 into an internal cavity formed by the attachment of the sleeve component 12 and the holding component 14. Sleeve component 12 (attached to holding component 14 and/or containing the botanicals) may then be inserted into and/or secured to covering component 10.

FIG. 5 shows sleeve component 12 configured in the unstructured state prior to the second flat piece of packaging being shaped to form the longitudinal shape of sleeve component 12 (as shown in FIG. 1). In some implementations the second flat piece of packaging may be formed of a single (i.e., contiguous) piece of packaging or may be formed of multiple pieces of packaging that are affixed to form a single piece of packaging. In some implementations, the second flat piece of packaging may be folded along the indicated lines to form the longitudinal shape of sleeve component 12. The second piece of packaging may include one or more fastening tabs 36a-c, one or more slits 38a-b, tabs 291-h, and/or other components. Responsive to sleeve component 12 being in the unstructured state, tabs 29a-h may not be engaged and/or support structure 28 may not be formed.

In some implementations, one or more of fastening tabs 36a-c may be configured to be inserted into one or more corresponding slits 38a-c to secure the second flat piece of packaging after folding and/or shaping of sleeve component 12. By way of non-limiting illustration, the second flat piece of packaging may be folded and/or shaped according to the direction indicated by the dotted arrow and/or or folded along the indicated lines, such that fastening tab 36a may be inserted into slit 38a, fastening tab 36b may be inserted into slit 38b, and/or fastening tab 36c may be inserted into slit 38c. In some implementations, the second flat piece of packaging may not include the one or more fastening tabs 22a-b and/or slits 24a-b, rather a first edge of the second flat piece of packaging may be glued or otherwise affixed to a second side edge to secure the longitudinal shape of sleeve component 12. FIG. 5 illustrates sleeve component 12 during a transition from the unstructured state to the transport state, such that the longitudinal shape of sleeve component 12 is formed and/or tabs 29a-h have not been engaged to form support structure 28.

Referring to FIG. 2, all or part of sleeve component 12 may remain attached to holding component 14 while apparatus 100 is configured in the display state. FIG. 2 shows the whole of sleeve component 12 secured to holding component 14 during the display state, however this is for illustrative purposed only and not indented to be limiting. In some implementations, tearing and/or removal of the perforated segments 32a-b may facilitate separation of sleeve component 12 into separate components. For example, tearing and/or removal of perforated segments 32a and 32b may facilitate separation of sleeve component 12 into a first section of sleeve component 12, a second section of sleeve component 12, and a third section of sleeve component 12 in accordance with the placement of perforated segments 32a-b along the length of the longitudinal shape of sleeve component 12. The first section of sleeve component 12 may be the length of the longitudinal shape that extends from the providing opening 26 to first perforated segment 32a. The second section of sleeve component 12 may be the length of the longitudinal shape that extends from first perforated segment 32a to second perforated segment 32b. The third section of sleeve component 12 may be the length of the longitudinal shape that extends from second perforated segment 32b to receiving opening 27. For example, removal of first perforated segment 32a may separate the first section of sleeve component 12 from a structure comprising the second and third sections of sleeve component 12 attached to holding component 14. In some implementations, the perforated segments 32a-b may be discarded and/or recycled after separation of sections of sleeve component 12.

Referring to FIG. 1, holding component 14 may be formed from a third flat piece of packaging material that is shaped to form a chamber. Holding component 14 may include a secondary opening 44, a chamber wall 46, connecting tab 42, and/or other components. Secondary opening 44 may be of an internal cavity of holding component 14 that extends to chamber wall 46. In some implementations, the chamber forming holding component 14 may be water-tight and/or leakproof.

Holding component 14 may be configured to be housed within sleeve component 12 while apparatus 100 is configured in the transport state. The shape of the chamber may be sized to facilitate inserting holding component 14 into receiving opening 27 of sleeve component 12. Responsive to housing component 14 being inserted into receiving opening 27, secondary opening 44 may be disposed within the internal cavity of sleeve component 12. Holding component 14 may be secured to sleeve component 12 subsequent to connecting tab 42 being inserted into slit 40 of sleeve component 12. In some implementations, holding component 14 and sleeve component 12 may be secured through one or more adhesive surfaces positioned on the interior surface of the longitudinal shape of sleeve component 12 and/or on the exterior surface of the chamber of holding component 14. In some implementations, holding component 14 may be configured to house/contain the bottom portions of the stems of the botanicals during the transport state.

Figure 7:
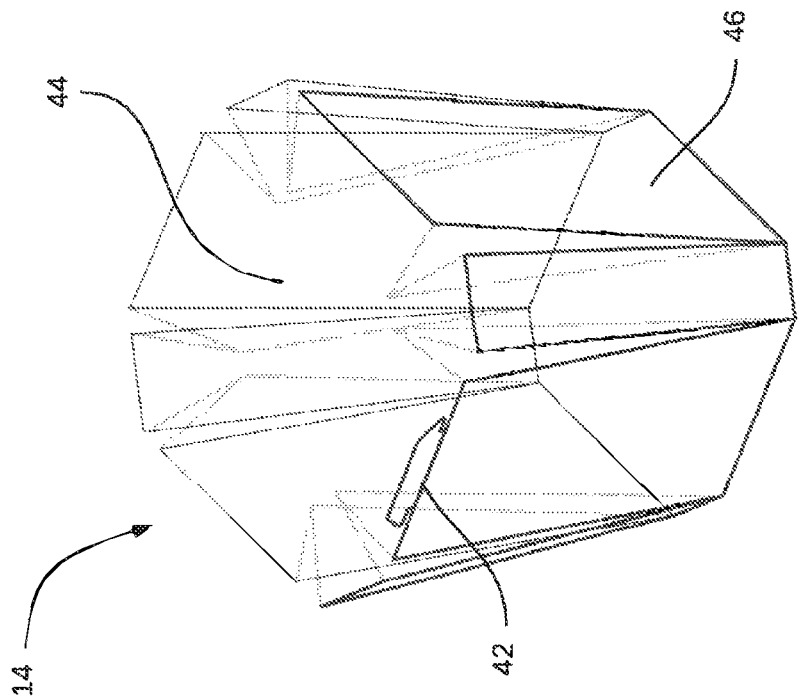
FIG. 7 illustrates the holding component of the apparatus, in accordance with one or more implementations.

FIG. 5 shows holding component 14 configured in the unstructured state prior to the third flat piece of packaging being shaped to form the chamber of holding component 14 (as shown in FIGS. 1 and 7). The third flat piece of packaging may be folded in accordance with the indicated lines (as shown in FIG. 5) to form the chamber of holding component 14. In some implementations, the third flat piece of packaging may include one or more adhesive surfaces configured to secure the shape of the chamber. The adhesive surfaces may be positioned on the interior surface and/or the exterior surface of the chamber of holding component 14 and may prevent holding component 14 from unraveling during the transport state and/or the display state. The third flat piece of packaging may be affixed to an intermediate flat piece of packaging 50 (as shown in FIG. 5). The intermediate flat piece of packaging 50 may be further affixed to the second flat piece of packaging forming sleeve component 12, such that the second flat piece of packaging, the *intermedia* flat piece of packaging 50, and the third flat piece of packaging form a single, contiguous flat piece of packaging.

Referring to FIG. 2, The internal cavity of holding component 14 may be configured to hold water and/or other liquids within holding component 14 during the display state. In some implementations, one or more sections of sleeve component 12 may be removed during the transition from the transport state to the display state. Removal of the one or more section of sleeve component 12 (including support structure 28) may facilitate access to holding component 14. Access to holding component 14 may allow the recipient of the package to provide water and/or other liquids to the internal cavity of holding component 14. In some implementations, holding component 14 may remain secured to one or more sections of sleeve component 12 (e.g., the second section of sleeve component 12 and/or the third section of sleeve component 12) after removal of the one or more perforated segments.

Holding component 14 secured to one or more of the second section of sleeve component 12 and/or the third section of sleeve component 12 may be inserted into covering component 10 (as indicated by the dotted arrow shown in FIG. 2). Responsive to holding component 14 being inserted into covering component 10, chamber wall 46 may be positioned at or near permeable structure 16 and/or holding component 14 may be housed partially or entirely in the internal cavity of covering component 10. In some implementations, covering component 10 may obstruct visibility of all or part of holding component 14 and/or one or more sections of sleeve component 12 still secured to holding component 14. In some implementations, holding component 14 may be inserted into covering component before or after the one or more perforated segments 32*a-b* are removed. Covering component 10 may function as an exterior vase structure for holding component 14 and the botanicals housed within holding component 14.

Although the present technology has been described in detail for the purpose of illustration based on what is currently considered to be the most practical and preferred implementations, it is to be understood that such detail is solely for that purpose and that the technology is not limited to the disclosed implementations, but on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. An apparatus configured to house botanicals during transport and to convert to a display assembly for displaying the botanicals, the apparatus comprising:
   a covering component formed from a first piece of packaging material that is shaped into a longitudinal shape having a primary opening at one end of the longitudinal shape;
   a sleeve component formed from a second piece of packaging material that is shaped into a longitudinal shape having a providing opening at one end and a receiving opening at the other end opposite the providing opening, wherein the sleeve component and the covering component are coupled responsive to the providing end of the sleeve component being inserted into the primary opening of the covering component, and wherein the second piece of packaging material is separate and distinct from the first piece of packaging material;
   a holding component formed from a third piece of packaging material, the third piece of packaging material being water resistant, wherein the holding component is shaped to form a chamber having a secondary opening at one end and a chamber wall at the other end opposite the secondary opening, wherein the holding component and the sleeve component are coupled responsive to the secondary opening of the holding component being inserted into the receiving opening of the sleeve component, and wherein the third piece of packaging material is separate and distinct from the first piece of packaging material and the second piece of packaging material; and
   wherein, in order to facilitate the apparatus being converted into the display assembly, the sleeve component is removable from the primary opening of the covering component to facilitate access to the holding component, the holding component is configured to be inserted into the covering component via the primary opening, such that the chamber wall of the holding component is positioned within the covering component at or near the end of the covering component opposite the primary opening.

2. The apparatus of claim 1, wherein the covering component includes one or more connecting tabs extending from an edge of the end of the covering component having the primary opening, and wherein the sleeve component includes one or more slits positioned on the end having the providing opening, such that connecting tabs of the covering component are inserted into the slits of the sleeve component to secure the covering component and the sleeve component.

3. The apparatus of claim 1, wherein the sleeve component includes one or more connecting tabs extending from an edge of the end of the sleeve component having the receiving opening, and wherein the holding component includes one or more slits positioned on the end having the secondary opening, such that connecting tabs of the sleeve component are inserted into the slits of the holding component to secure the sleeve component and the holding component.

4. The apparatus of claim 1, wherein the covering component includes a permeable structure at the other end of the longitudinal shape opposite the primary opening, wherein the permeable structure of the covering component is formed of one or more triangular flaps extending from an edge of the second end of the covering component, wherein the one or more triangular flaps are configured to fold inwardly and engage with one or more other triangular flaps.

5. The apparatus of claim 4, wherein each of the triangular flaps of the covering component include a proximal end near the edge of a covering component sidewall and a distal end opposite the proximal end, wherein the distal end of an individual triangular flap has a hook-shape configured to hook to the other ones of triangular flaps.

6. The apparatus of claim 1, wherein the sleeve component includes one or more perforated segments along the length of the longitudinal shape, wherein individual ones of the perforated segments runs around the circumference of the longitudinal shape of the sleeve component.

7. The apparatus of claim 6, wherein the one or more perforated segments on the sleeve component include a first perforated segment near the receiving opening of the sleeve component and a second perforated segment near the providing opening of the sleeve component, and wherein tearing of the perforated segments separates the sleeve component into one or more pieces according to the placement of the perforated segments.

8. The apparatus of claim 1, wherein the providing opening includes a support structure formed of one or more tabs extending across the providing opening, and wherein the tabs forming the support structure of the sleeve component are positioned in a grid formation across the providing opening.

9. The apparatus of claim 8, wherein each of the tabs extending from the edge of the end with the providing opening are configured to attach with other tabs, such that the attached tabs are positioned across the providing opening.

10. The apparatus of claim 1, wherein the covering component is configured to cover and protect the flowers of the botanicals during transport, and wherein the holding component is configured to hold the bottom stems of the botanicals.

* * * * *